United States Patent [19]
Raetzsch et al.

[11] Patent Number: 6,080,819
[45] Date of Patent: Jun. 27, 2000

[54] BLENDS OF OLEFIN POLYMERS AND SYNDIOTACTIC VINYL POLYMERS

[75] Inventors: Manfred Raetzsch, Kirchschlag, Austria; Manfred Arnold, Leissling; Jana Knorr, Wolfen, both of Germany

[73] Assignee: Borealis AG, Schwechat-Mannswoerth, Austria

[21] Appl. No.: 09/096,051

[22] Filed: Jun. 11, 1998

[30] Foreign Application Priority Data

Jun. 12, 1997 [DE] Germany ............ 197 24 743

[51] Int. Cl.[7] ............ C08F 8/00; C08L 33/04; C08L 35/02; C08L 23/00; C08L 23/04

[52] U.S. Cl. ............ 525/240; 525/191; 525/222; 525/241; 525/242; 525/243; 525/244; 525/247; 525/249; 526/90; 526/92; 526/93; 526/114; 526/119; 526/152; 526/226

[58] Field of Search ............ 525/191, 222, 525/240, 241, 242, 243, 244, 247, 249; 526/90, 92, 93, 114, 119, 152, 226

[56] References Cited

U.S. PATENT DOCUMENTS 5,753,578  5/1998  Santi et al. ............ 502/114

*Primary Examiner*—Patrick D. Niland
*Attorney, Agent, or Firm*—Jordan and Hamburg LLP

[57] ABSTRACT

Blends of olefin polymers and syndiotactic vinyl polymers are produced by the catalytic polymerization of olefins and aromatic vinyl compounds or methacrylate esters as vinyl compounds in inert diluents in the presence of a catalyst mixture of transition metal compounds, metalloxane compounds and metal alkyl compounds.

The blends have a finely dispersed distribution of the blending components and are suitable for the production of films, sheets, fibers, panels, coatings, pipes, hollow objects, injection molded products and foams.

18 Claims, No Drawings

BLENDS OF OLEFIN POLYMERS AND SYNDIOTACTIC VINYL POLYMERS

BACKGROUND OF THE INVENTION

The invention relates to blends of olefin polymers and syndiotactic polyvinyl aromatic polymers and/or syndiotactic polymethacrylate esters, which have a finely dispersed distribution of the blend components, a high dimensional stability at elevated temperatures and an improved printability and paintability, as well as to a method for their production.

Blends of olefin polymers and conventional atactic polyvinyl aromatic polymers and/or conventional isotactic polymethacrylate esters are known. The thermodynamic incompatibility of the components of the blend is responsible for the coarsely dispersed structure and the unsatisfactory material properties of the blends (Benderly, D., J. Mater. Sci. Lett. 1996, 15 (15), 1349–1352). To achieve a finely dispersed structure of the blend components, compatibilizers are added, which bring about a partial compatibility of the components at the phase boundary.

For blends of polyethylene and atactic polystyrene, a compatibilization of the incompatible components is achieved by the admixing of styrene-ethylene/propylene diblock copolymers (Domininghaus, H., Gummi-Fasem-Kunststoffe 45 (1992) 7, 352–357) or of styrene-ethylene/butadiene-styrene triblock copolymers (Yang, L., J. Appl. Polymer Sci. 58 (1995), 117–127).

Likewise, the reactive extrusion of polyethylene with polystyrene in the presence of peroxides and cross linking co-agents (EP 0 210 306; Rudin, A., Polymer Engng. Sci. 32 (1992) 1678–1686) as well of styrene-vinylbenzaldehyde copolymers as co-components (Rudin, A., Polymer Engng. Sci. 28 (1988) 21, 1434–1442) leads to an improvement in the compatibility of the components, since the compatibilizer is formed in situ by the partial cross linking of the components.

Blends of ethylenecycloolefin copolymers, such as ethylene-norbornene copolymers with atactic polystyrene are also known (DD 223 721).

Inhomogeneous blends are furthermore formed by the thermoplastic processing of mixtures of isotactic polypropylene and atactic polystyrene (Fortelny, I., J. Applied Polymer Sci. 59 (1996) 155–164).

Known methods of compatibilizing blends of isotactic polypropylene and atactic polystyrene are the addition of styrene-grafted polypropylene (EP 0 435 340), styrene-grafted elastomeric polypropylene (EP 0 640 650), elastomeric polybutene (PCT-WO 94 28 066), hydrogenated isoprene-styrene block copolymers (JP 06 049 261), styrene-ethylene/butadiene-styrene block copolymers (JP 04 045 140) and of styrene/butadiene block copolymers (JP 06 271 717; Navratilova, E., Polym. Networks Blends 6 (1996) 3, 127–133).

Furthermore, effective, known compatibilizers in blends of isotactic polypropylene and atactic polystyrene are segmented copolymers, which are formed by the reaction of styrene-maleic anhydride copolymers with amino-functionalized polypropylene (PCT-WO 93 02 140) or anhydride-functionalized polypropylene (JP 04 053 853), by the reaction of hydrogenated butadiene-styrene block copolymers, modified with maleic anhydride, with polypropylene functionalized with epoxy groups (JP 04 266 953), by reaction of polystyrene, modified with glycidyl groups, and polypropylene, modified with acid anhydride groups (JP 05 179 094) or by reaction of styrene-maleic anhydride copolymers with polypropylene, modified with acid anhydride, and bifunctional compounds of opposite reactivity (JP 05 209 096).

A reactive compatibilization of isotactic polypropylene with atactic polystyrene is accomplished by reaction with peroxides in the melt (JP 59 226 042), optionally in the presence of styrene-grafted polypropylene (JP 04 041 614) or in the presence of aromatic vinyl monomers (JP 05 140 245).

An increased compatibility of polypropylene-polystyrene blends is also achieved by forming the atactic polystyrene components in situ by the free radical styrene polymerization in the presence of dispersed polypropylene (EP 0 435 340).

It is also known that compatible blends may be produced from polypropylene and polystyrene in situ by a special polymerization technology using Ziegler-Natta catalysts ("reactor blend"); however, the polystyrene component formed is also an atactic polymer (Modem Plastics Intern. (1996) 3, 27; (1996) 4, 93).

For blends of polypropylene and polymethylmethacrylate, the addition of reaction products of amino-functionalized polypropylene and styrene-maleic anhydride copolymers as compatibilizers, for achieving partial compatibility of the components, is described (WO 93 02140).

For blends of poly-4-methylpentene, poly-1-butene or polypropylene with poly(methyl methacrylate), the corresponding azlactone-grafted polyolefins represent suitable compatibilizers for the thermodynamically incompatible blend components (U.S. Pat. No. 5,262,484).

It is furthermore known that polypropylene-poly(methyl methacrylate) block copolymers may be used to improve the material properties of polypropylene-poly(methyl methacrylate) blends (Hosoda, S., Polymer J. 1991 (23), 277). These block copolymers can be synthesized by the complex coordinative polymerization of propylene in the presence of ethylene-bis-(tetrahydroindenyl) zirconium dichloride/aluminoxane catalysts, reaction of the terminal ethylene groups with magnesium bromide and use of the modified polypropylene as macromolecular initiator for the anionic polymerization of methyl methacrylate (Shiono. T., Macromolecules 1994 (27) 6229–6231).

Blends of olefin polymers and conventional, atactic polyvinyl aromatic polymers and conventional isotactic polymethacrylate esters furthermore have the disadvantage that the dimensional stability of these blends at elevated temperatures is limited by the low softening temperatures of the atactic polyvinyl aromatic polymers or the isotactic polymethacrylate esters. For example, the softening temperature of the conventional, atactic polyvinyl aromatic polymers, polystyrene, is 90°–100° C., of poly-4-chlorostyrene 120°–128° C., of poly-4-methoxystyrene 80°–90° C. and of poly-α-methylstyrene 180°–185° C. and the softening temperature of the conventional isotactic polymethacrylate esters, polymethacrylate is 160° C. and of poly-(t-butyl methacrylate) 104° C. (Brandrup-Immergut, Polymer Handbook, Interscience Publishers New York, 1989).

A further decrease in dimensional stability at elevated temperatures is brought about by the furthermore used elastomeric compatibilizer components in the blends of olefin polymers and conventional vinyl polymers.

Compared to the usual atactic polyvinyl aromatic polymers or the usual isotactic polymethacrylate esters, highly ordered syndiotactic polyvinyl aromatic polymers or polymethacrylate esters have a significantly higher crystallite melting temperature. For example, the melting temperature of isotactic polystyrene is of the order of 210° to 225° C., of syndiotactic polystyrene 255° to 270° C., of syndiotactic poly(methyl methacrylate) approximately 200° C. and of syndiotactic poly-(t-butyl methacrylate) approximately 165° C.

Methods of synthesizing syndiotactic polyvinyl aromatic polymers and syndiotactic polymethacrylate esters are known.

Known methods of synthesizing syndiotactic polystyrene are the free radical polymerization of styrene at temperatures below −65° C. (Doi, Y., Macromolecules 19 (1986), 289), as well as the complex coordinative polymerization in the presence of aluminum alkyl/titanium halides at temperatures below −65° C. (Natta, G., J. Amer. Chem. Soc. 84 (1962), 1488).

Catalyst systems of aluminum alkyl/cyclopentadienyl titanium alcoholates with alkyl aluminoxanes as co-catalysts bring about the complex coordinative polymerization of styrene already at room temperature and also at elevated temperatures, formation of syndiotactic polystyrene (EP 0 210 616). The molecular weight distribution of the syndiotactic polystyrene can be broadened by the use of mixtures of cyclopentadienyl titanates (EP 0 420 134). High yields are achieved if a catalyst system of hydro-tris-pyrazolyl borate and cyclopentadienyl titanium dimethoxide is used as titanium component at an Al/Ti ratio of 400 (EP 0 617 052).

Suitable catalyst systems for the polymerization of methacrylate esters with formation of syndiotactic products are vanadyl trichloride/methyl aluminoxanes and vanadic acetyl acetonate/methyl aluminoxane (Endo, K., Macromol. Rapid Commun. 15, 893–896; Macromol. Chem. Phys. 196 (1995), 2065–2072) and dicyclopentadienyl zirconium dichloride/methyl aluminoxane (Deng, H., Macromol. Chem. Phys. 196 (1995), 1971–1980).

Problems with the melt homogenization of polyolefins with syndiotactic polyvinyl aromatic polymers or syndiotactic polymethacrylate esters arise out of the highly diverging melting points of the polyolefins (polyethylene 112°–125° C., isotactic polybutene 124°–130° C., isotactic polypropylene 159°–161° C.) and of the syndiotactic aromatic vinyl polymers (>250° C.) or the syndiotactic polymethacrylate esters (>165° C.).

The preparation of blends of olefin polymers and syndiotactic vinyl polymers and/or syndiotactic polymethacrylate esters in situ using known catalysts systems for the catalytic polymerization of the corresponding monomers and known reaction conditions does not lead to any result.

It is an object of the present invention to develop blends of olefin polymers and syndiotactic polyvinyl aromatic polymers and/or syndiotactic polymethacrylate esters, which have a finely dispersed distribution of the components of the blend, a high dimensional stability at elevated temperatures and an improved printability and paintability, as well as a method for preparing them.

SUMMARY OF THE INVENTION

This objective was accomplished by blends of olefin polymers and syndiotactic vinyl polymers with a finely dispersed distribution of the components of the blend, a high dimensional stability at elevated temperatures and improved printability and paintability, the blends, pursuant to the invention, being 1 to 99% by weight of $C_2$–$C_{20}$ polyolefins or $C_2$–$C_{20}$ olefin copolymers, 99% to 1% by weight of syndiotactic $C_8$–$C_{14}$ polyvinyl aromatic polymers and/or syndiotactic $C_4$–$C_{15}$ polymethacrylate esters or $C_4$–$C_{15}$ methacrylate ester copolymers as syndiotactic vinyl polymers and optionally 0.01 to 40% by weight, based on the total weight of the polymers, of additives, the blends being prepared by a) the catalytic polymerization of $C_2$–$C_{20}$ olefins, optionally in admixture with 99% to 1% by weight of $C_8$–$C_{14}$ aromatic vinyl compounds, at −30° C. to +100° C. under inert conditions in the pressure range of 0.1 bar to 20 bar in the presence of 10 to 2,000% by weight, based on the weight of the $C_2$–$C_{20}$ olefins and $C_8$–$C_{14}$ aromatic vinyl compounds, of inert diluent and 0.1% by weight to 10% by weight, based on the weight of the $C_2$–$C_{20}$ olefins used, of a catalyst mixture, which is $10^{-4}$% by weight to $10^{-2}$% by weight of bridged metallocene complexes A, 0.1 to 10% by weight of metalloxane compounds B, 0.001% by weight to 1.0% by weight of metal alkyl compounds C and, in the presence of $C_8$–$C_{14}$ aromatic vinyl compounds in the reaction mixture, $10^{-4}$% by weight to $10^{-2}$% by weight of transition metal compounds D, in each case based on the weight of the $C_2$–$C_{20}$ olefins and $C_8$–$C_{14}$ aromatic vinyl compounds used, b) optionally, subsequently, addition of 1 to 900%, based on the $C_2$–$C_{20}$ olefins and $C_8$–$C_{14}$ aromatic vinyl compounds used in a), of $C_4$ to $C_{15}$ methacrylate esters, 0.001% by weight to 1.0% by weight, based on the weight of the $C_2$–$C_{20}$ olefins and $C_4$–$C_{15}$ methacrylate esters used, of metal alkyl compounds E and optionally $10^{-4}$% by weight to $5 \times 10^{-3}$% by weight of bridged metal complexes A, 0.1% by weight to 6% by weight of metalloxane compounds B and 0.001% by weight to 0.05% by weight of metal alkyl compounds C, in each case based on the weight of the $C_2$–$C_{20}$ olefins and $C_8$–$C_{14}$ aromatic vinyl compounds and $C_4$–$C_{15}$ methacrylate esters used, the metal alkyl compounds E being metal alkyls of magnesium, zinc or lithium or mixtures of these metal alkyls, which are used optionally with addition of ether alcoholates, and the compounds A, B and C being identical with those named under a), c) subsequently the pressure optionally being increased to 50 bar, d) subsequently, the $C_8$–$C_{14}$ aromatic vinyl compounds, $C_4$–$C_{15}$ methacrylate esters and unreacted $C_2$–$C_{20}$ olefins, contained in the reaction mixtures a) and b), being polymerized catalytically at temperatures of −30° C. to 100° C. in the presence of the catalysts contained in the reaction mixtures a) and b), e) subsequently, the catalysts being deactivated by acids and the $C_2$–$C_{20}$ polyolefins or $C_2$–$C_{20}$ olefin copolymers and the syndiotactic vinyl polymers being isolated in a known manner, f) and subsequently, the mixture of $C_2$–$C_{20}$ polyolefins or $C_2$–$C_{20}$ olefin copolymers and syndiotactic vinyl polymers being plasticized in a known manner in extruders or in kneaders for thermoplastic materials at temperatures above the melting temperature of the $C_2$–$C_{20}$ polyolefins or $C_2$–$C_{20}$ olefin copolymers, reaction step b) being mandatory in the absence of $C_8$–$C_{14}$ aromatic vinyl compounds in the reaction mixture a) and optional in their presence, and, before and/or during step f) of the method, 0.01 to 2.5% by weight of stabilizers, 0.1 to 1% by weight of antistatic agents, 0.2 to 3% by weight of pigments, 0.05 to 1% by weight of nucleating agents, 5 to 40% by weight of fillers and reinforcing agents, 2 to 20% by weight of flame retardants, 1 to 30% by weight of elastomers as impact strength modifiers and/or 0.01 to 1% by weight of processing aids, in each case based on the weight of the $C_2$–$C_{20}$ polyolefins or $C_2$–$C_{20}$ olefin copolymers and of the syndiotactic vinyl polymers, optionally being added as additives.

DETAILED DESCRIPTION OF THE INVENTION

Pursuant to the invention, the $C_2$–$C_{20}$ polyolefins or $C_2$–$C_{20}$ olefin copolymers are olefin polymers, which can be synthesized by the complex coordinative polymerization of olefins and or cycloolefins, such as $C_2$–$C_{20}$ α-olefin, particularly ethylene, propylene, 1-butene, 1-hexene, 1-octene, 1-decene, 1-heptene, 1-pentene and/or 1-nonene, and/or $C_5$–$C_{20}$ branched olefins, particularly 4-phenyl-1-butene, 6-phenyl-1-hexene, 3-methyl-1-butene, 4-methyl-1-pentene, 3-methyl-1-pentene, 3-methyl-1-hexene, 4-methyl-1-hexene, 5-methyl-1-hexene, 3,3-dimethyl-1-pentene, methylethyl-1-pentene, ethyl-1-pentene, ethyl-1-hexene, dimethyl-1-butene, 3,4-diethyl-1-butene, ethyl-1-octene, dimethyl-1-pentene, 4,4-dimethyl-1-pentene, cyclopentene, methylcyclohexene, vinylcyclohexane, vinylcyclohexene, norbornene, 5-methylnorbornene, 5-isobutylnorbornene, 5-ethylnorbornene, 5,6-dimethyl-norbornene and/or 1-methylnorbornene, or mixtures of these olefins.

Olefin polymers with a high degree of order are preferred as $C_2$–$C_{20}$ polyolefins or $C_2$–$C_{20}$ olefin copolymers. Amorphous olefin polymers, as well as mixtures of olefin polymers with a high degree of order and amorphous olefin polymers, in any mixing ratio, are also suitable.

Examples of syndiotactic aromatic vinyl compounds for the preparation of the inventive blends, are aromatic vinyl compounds, which can be synthesized by the complex coordinative polymerization of aromatic vinyl compounds, such as α-ethylstyrene, α-methylstyrene, bromostyrene, butenyl-α-methylstyrene, butenyl-styrene, chloroethylstyrene, chlorostyrene, dimethylstyrene, dimethyl-t-butylsilylstyrene, divinylbenzene, divinyltoluene, ethylbutenylstyrene, fluorostyrene, isopropenylstyrene, methylbutenylstyrene, methylfluorostyrene, methylstyrene, pentenylstyrene, propenylstyrene, styrene, t-butylstyrene, triethylsilylstyrene, trimethylsilylstyrene, triphenylsilylstyrene, vinylbiphenyl, vinylbromobiphenyl, vinylbutenylbiphenyl, vinylchlorobiphenyl, vinylfluorobiphenyl, vinylmethylbiphenyl, vinylphenylanthracene, vinylphenylnaphthalene, vinylphenylphenanthrene, vinylphenylpyrene, vinylphenylterphenyl, vinylterphenyl and/or vinyltrimethylsilylbiphenyl or from mixtures of these aromatic vinyl monomers, with the formation of a predominantly syndiotactic chain structure.

The $C_4$–$C_{15}$ polymethacrylate esters or $C_4$–$C_{15}$ methacrylate ester copolymers in the inventive blends of $C_2$–$C_{20}$ polyolefins or $C_2$–$C_{20}$ olefin copolymers and syndiotactic vinyl polymers are syndiotactic $C_4$–$C_{15}$ polymethacrylate esters and/or $C_4$–$C_{15}$ methacrylate ester copolymers, which can be synthesized by the catalytic polymerization of $C_4$–$C_{15}$ methacrylate esters or mixtures of $C_4$–$C_{15}$ methacrylate esters, preferably methyl methacrylate, t-butyl methacrylate, glycidyl methacrylate, allyl methacrylate, methallyl methacrylate, $C_2$–$C_8$ alkyl methacrylates, such as ethyl methacrylate or ethylhexyl methacrylate, $C_2$–$C_8$ hydroxyalkyl methacrylates, such as 2-hydroxyethyl methacrylate or hydroxyoctyl methacrylate, $C_3$–$C_8$ cycloalkyl methacrylates, such as cyclohexyl methacrylate or ethylcyclohexyl methacrylate and/or $C_6$–$C_{12}$ aryl methacrylates, such as benzyl methacrylate or t-butylphenyl methacrylate, with formation of a predominantly syndiotactic chain structure.

The bridged metallocene complexes A of the catalyst mixture, which are used pursuant to the invention for the preparation of blends of olefin polymers and syndiotactic vinyl polymers, are metallocene complexes having the formula

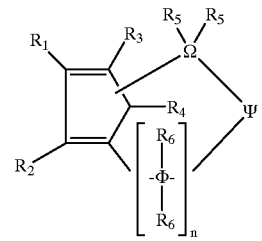

as well as mixtures of these bridged metallocene complexes, in which $R_1$, $R_2$, $R_3$, $R_4$ are hydrogen, $C_1$–$C_{12}$ alkyl, $C_6$–$C_{17}$ aryl, $C_6$–$C_{19}$ arylalkyl, $C_5$–$C_7$ cycloalkyl, $C_1$–$C_8$ alkyl-substituted $C_5$–$C_7$ cycloalkyl, $(C_1$–$C_{12}$ alkyl)-Si-$(C_1$–$C_{12}$ alkyl$)_2$, $(C_6$–$C_{17}$ aryl)-Si-$(C_6$–$C_{17}$ aryl$)_2$, $(C_6$–$C_{19}$ arylalkyl)-Si-$(C_6$–$C_{19}$ arylalkyl$)_2$, $(C_5$–$C_7$ cycloalkyl)-Si-$(C_5$–$C_7$ cycloalkyl$)_2$ and/or (alkyl-substituted $C_5$–$C_7$ cycloalkyl)-Si-(alkyl-substituted $C_5$–$C_7$ cycloalkyl$)_2$, $R_5$ is hydrogen, halogen, $C_1$–$C_{12}$ alkyl, $C_6$–$C_{17}$ aryl, $C_6$–$C_{19}$ arylalkyl, $C_5$–$C_7$ cycloalkyl and/or $C_1$–$C_{12}$ alkyl-substituted $C_5$–$C_7$ cycloalkyl, $R_6$ is hydrogen, $C_1$–$C_{12}$ alkyl, $C_6$–$C_{17}$ aryl, $C_6$–$C_{19}$ arylalkyl, $C_5$–$C_7$ cycloalkyl and/or $C_1$–$C_8$ alkyl-substituted $C_5$–$C_7$ cycloalkyl, Ω is Ti, Zr, Hf, V, Nb, and/or Ta, Φ is carbon and/or silicon and n is a whole number from 1 to 6, is germanium and/or tin and n=1, Ψ is oxygen, sulfur, —N($C_1$–$C_{12}$ alkyl), —N($C_6$–$C_{17}$ aryl)-, —N($C_6$–$C_{19}$ arylalkyl), —N($C_5$–$C_7$ cycloalkyl)-, —N(alkyl-substituted $C_5$–$C_7$ cycloalkyl)-, —P($C_1$–$C_{12}$ alkyl)-, —P($C_6$–$C_{17}$ aryl)-, —P($C_6$–$C_{19}$ arylalkyl)-, —P($C_5$–$C_7$ cycloalkyl)-, —P(alkyl-substituted $C_5$–$C_7$ cycloalkyl), $(C_1$–$C_{12}$ alkyl)Si-$(C_1$–$C_{12}$ alkyl$)_2$, $(C_6$–$C_{17}$ aryl)-Si-$(C_6$–$C_7$ aryl$)_2$, $(C_6$–$C_{19}$ arylalkyl)-Si-$(C_6$–$C_{19}$ arylalkyl$)_2$, $(C_5$–$C_7$ cycloalkyl)-Si-$(C_5$–$C_7$ cycloalkyl$)_2$, (alkyl-substituted $C_5$–$C_7$ cycloalkyl)-Si-(alkyl-substituted $C_5$–$C_7$ cycloalkyl$)_2$ and/or

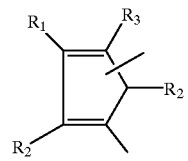

wherein $R_1$, $R_2$, $R_3$, $R_4$ have the meaning as above.

The metalloxane compounds B of the catalyst mixture, which have been used pursuant to the invention for the preparation of blends of olefin polymers and syndiotactic vinyl polymers, are oligomeric and/or polymeric cyclic and/or linear metalloxane compounds of metals of the 3rd main group and/or the 4th main group with the general formula (1) or (2)

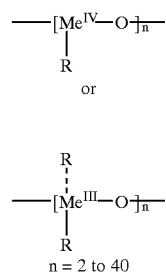

n = 2 to 40 as well as monomeric or oligomeric linear metalloxane compounds having the general formula (3) or (4)

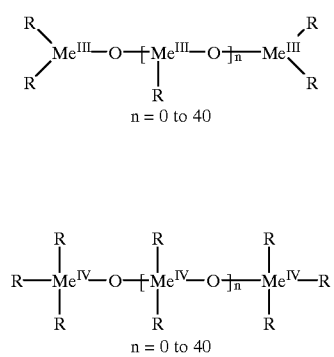

in which $Me^{IV}$=Ge, Sn, Pb, $Me^{III}$=B, Al, Ga, In, R=$C_1$–$C_{18}$ alkyl, as well as mixtures of these metalloxanes.

The metal alkyl compounds C of the catalyst mixture, which are used pursuant to the invention for the preparation of blends of olefin polymers and syndiotactic vinyl polymers, are metal alkyls of boron and/or aluminum or of mixtures of these metal alkyl compounds.

The transition metal compounds D of the catalyst mixture, which are used pursuant to the invention in the presence of $C_8$–$C_{14}$ aromatic vinyl compounds in the reaction mixture for preparing blends of olefin polymers and syndiotactic vinyl polymers, are halides, alkoxides, alkoxyhalides, acetyl acetonates, cyclopentadienyl compounds, indenyl compounds and/or additional N-, P- or B-containing organometallic compounds of transition metals of the IV A and V A groups of the periodic system, as well as of mixtures of these transition metal compounds.

The metal alkyl compounds E, which are used pursuant to the invention for the preparation of blends of olefin polymers and syndiotactic vinyl polymers in the presence of $C_4$–$C_{15}$ methacrylate esters in the reaction mixture, are metal alkyls of magnesium, zinc or lithium.

As stabilizers for the preparation of the inventive blends of olefin polymers and syndiotactic vinyl polymers, preferably mixtures of 0.01 to 0.6% by weight of phenolic antioxidants, 0.01 to 0.6% by weight of 3-arylbenzofuranones, 0.01 to 0.6% by weight of processing stabilizers based on phosphites, 0.01 to 0.6% by weight of high-temperature stabilizers based on disulfides and thioethers and/or 0.01 to 0.8% by weight of sterically hindered amines (HALS) are used.

Suitable phenolic antioxidants are 2-t-butyl-4,6-dimethylphenol, 2,6-di-t-butyl-4-methylphenol, 2,6-di-t-butyl-4-isoamylphenol, 2,6-di-t-butylethylphenol, 2-t-butyl-4,6-diisopropylphenol, 2,6-dicyclopentyl-4-methylphenol, 2,6-di-t-butyl-4-methoxymethylphenol, 2-t-butyl-4,6-dioctadecylphenol, 2,5-di-t-butylhydroquinone, 2,6-di-t-butyl-4,4-hexadecyloxyphenol,2,2'-methylene-bis(6-t-butyl-4-methylphenol), 4,4'-thio-bis-(6-t-butyl-2-methylphenol), octadecyl 3(3,5-di-t-butyl-4-hydroxyphenyl) propionate, 1,3,5-trimethyl-2,4,6-tris(3'-5'-di-t-butyl-4-hydroxybenzyl)benzene and/or pentaerythritoltetrakis(3-(3,5-di-t-butyl-4-hydroxyphenyl)) propionate.

As benzofuranone derivative, particularly 5,7-di-t-butyl-3-(3,4-di-methylphenyl)-3H-benzofuran-2-one is suitable.

As HALS compounds, bis-2,2,6,6-tetramethyl-4-piperidyl sebacate and/or poly-((1,1,3,3,-tetramethylbutyl)-imino)-1,3,5-triazine-2,4,diyl)(2,2,6,6-tetramethylpiperidyl)-amino)-hexamethylene4-(2,2,6,6-tetramethyl) piperidyl)-imino) are particularly suitable.

Preferably suitable elastomers, as impact strength modifiers for the inventive blends of olefin polymers and syndiotactic vinyl polymers, are ethylenepropylene rubber, ethylene-propylene-diene terpolymers, styrene-butadiene-styrene block copolymers, styrene-ethylene-butadiene-styrene block copolymers, acrylate rubber, silicone rubber and/or fluoroolefin elastomers.

As processing aids, calcium stearate, magnesium stearate and/or waxes can be used.

A preferred composition of the blends contains the syndiotactic vinyl polymers components in the form of finely dispersed particles, which are not melted and preferably have an average particle diameter of 5 to 250 µm.

The blends of olefin polymers and syndiotactic vinyl polymers with a finely dispersed distribution of the components of the blend, a high dimensional stability at elevated temperatures and improved printability and paintability, are produced pursuant to the invention according to a method by a) the catalytic polymerization of $C_2$–$C_{20}$ olefins, optionally in admixture with 99% to 1% by weight of $C_8$–$C_{14}$ aromatic vinyl compounds, at −30° C. to +100° C. under inert conditions in the pressure range of 0.1 bar to 20 bar in the presence of 10 to 2,000% by weight, based on the weight of the $C_2$–$C_{20}$ olefins and $C_8$–$C_{14}$ aromatic vinyl compounds, of inert diluent and 0.1% by weight to 10% by weight, based on the weight of the $C_2$–$C_{20}$ olefins used, of a catalyst mixture, which consists of $10^{-4}$% by weight to $10^{-2}$% by weight of bridged metallocene complexes A, 0.1 to 10% by weight of metalloxane compounds B, 0.001% by weight to 1.0% by weight of metal alkyl compounds C and, in the presence of $C_8$–$C_{14}$ aromatic vinyl compounds in the reaction mixture, $10^{-4}$% by weight to $10^{-3}$% by weight of transition metal compounds D, in each case based on the weight of the $C_2$–$C_{20}$ olefins and $C_8$–$C_{14}$ aromatic vinyl compounds used, the bridged metallocene complexes A representing metallocene complexes of the formula

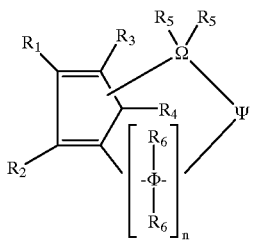

as well as mixtures of these bridged metallocene complexes, in which $R_1$, $R_2$, $R_3$, $R_4$ are hydrogen, (Si-substituted) alkyl, (Si-substituted) aryl $R_5$, $R_6$ are hydrogen, halogen, alkyl, aryl, $\Omega$ is Ti, Zr, Hf, V, Nb, and/or Ta, $\Phi$ is carbon and/or silicon and n is a whole number from 1 to 6, is germanium and/or tin and n=1, $\Psi$ is oxygen, sulfur, alkyl- or aryl-substituted N, P or Si or (substituted) cyclopentadienyl, the metalloxane compounds B representing oligomeric and/or polymeric cyclic and/or linear metalloxane compounds of metals of the 3rd main group and/or the 4th main group with the general formula (1) or (2)

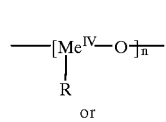

(1)

or

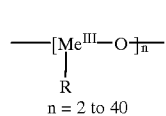

(2)

n = 2 to 40 as well as monomeric or oligomeric linear metalloxane compounds having the general formula (3) or (4)

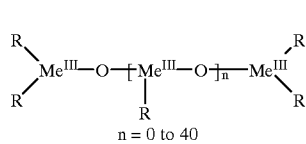

(3)

n = 0 to 40

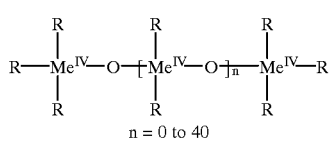

(4)

n = 0 to 40 in which $Me^{IV}$=Ge, Sn, Pb, $Me^{III}$=B, Al, Ga, In, R=$C_1$–$C_{18}$ alkyl, as well as mixtures of these metalloxanes, the metal alkyl compounds C representing metal alkyl of boron and/or aluminum or mixtures of these metal alkyl compounds, and the transition metal compounds D, contained in the catalyst mixture in the presence of $C_8$–$C_{14}$ aromatic vinyl compounds in the reaction mixture, representing halides, alkoxides, alkoxyhalides, acetyl acetonates, cyclopentadienyl compounds, indenyl compounds and/or additional N-, P- or B-containing organometallic compounds of transition metals of the groups IV A and V A of the periodic system, as well as of mixtures of these transition metal compounds, b) optionally, subsequently, addition of 1 to 900%, based on the $C_2$–$C_{20}$ olefins and $C_8$–$C_{14}$ aromatic vinyl compounds used in a), of $C_4$ to $C_{15}$ methacrylate esters, 0.001% by weight to 1.0% by weight, based on the weight of the $C_2$–$C_{20}$ olefins and $C_4$–$C_{15}$ methacrylate esters used, of metal alkyl compounds E and optionally $10^{-4}$% by weight to $5 \times 10^{-3}$% of bridged metal complexes A, 0.1% by weight to 6% by weight of metalloxane compounds B and 0.001% by weight to 0.05% by weight of metal alkyl compounds C, in each case based on the weight of the $C_2$–$C_{20}$ olefins and $C_8$–$C_{14}$ aromatic vinyl compounds and $C_4$–$C_{15}$ methacrylate esters used, the metal alkyl compounds E being metal alkyls of magnesium, zinc or lithium or mixtures of these metal alkyls, which are used optionally with addition of ether alcoholates, and the compounds A, B and C being identical with those named under a), c) subsequently the pressure optionally being increased to 50 bar, d) subsequently, the $C_8$–$C_{14}$ aromatic vinyl compounds, $C_4$–$C_{15}$ methacrylate esters and unreacted $C_2$–$C_{20}$ olefins; contained in the reaction mixtures a) and b), being polymerized catalytically at temperatures of –30° C. to 100° C. in the presence of the catalysts contained in the reaction mixtures a) and b), e) subsequently, the catalysts being deactivated by acids and the $C_2$–$C_{20}$ polyolefins or $C_2$–$C_{20}$ olefin copolymers and the syndiotactic vinyl polymers being isolated in a known manner, f) and subsequently, the mixture of $C_2$–$C_{20}$ polyolefins or $C_2$–$C_{20}$ olefin copolymers and syndiotactic vinyl polymers being plasticized in a known manner in extruders or in kneaders for thermoplastic materials at temperatures above the melting temperature of the $C_2$–$C_{20}$ polyolefins or $C_2$–$C_{20}$ olefin copolymers, reaction step b) being mandatory in the absence of $C_8$–$C_{14}$ aromatic vinyl compounds in the reaction mixture a) and optional in their presence, and, before and/or during step f) of the method, 0.01 to 2.5% by weight of stabilizers, 0.1 to 1% by weight of antistatic agents, 0.2 to 3% by weight of pigments, 0.05 to 1% by weight of nucleating agents, 5 to 40% by weight of fillers and reinforcing agents, 2 to 20% by weight of flame retardants, 1 to 30% by weight of elastomers as impact strength modifiers and/or 0.01 to 1% by weight of processing aids, in each case based on the weight of the $C_2$–$C_{20}$ polyolefins or $C_2$–$C_{20}$ olefin copolymers and of the syndiotactic vinyl polymers, optionally being added as additives.

As bridged, metallocene complexes A of the catalyst for the inventive method of producing blends of olefin polymers and syndiotactic vinyl polymers, especially the following, bridged metallocene complexes are preferably suitable: dimethylsilanediyl-bis(methylindenyl) zirconium dichloride, dimethylsilanediyl-bis(3-t-butyl-5-butylcyclopentadienyl) zirconium dichloride, dimethylsilanediyl-bis(3-t-butyl-5-methylcyclopentadienyl) zirconium chloride, dimethylsilanediyl-bis (cyclopentadienyl) zirconium chloride, dimethylsilanediyl-bis(indenyl) zirconium chloride, dimethylsilanediyl-bis (methylindenyl) zirconium dichloride, dimethylsilanediyl-bis(methylisopropylcyclopentadienyl) zirconium dichloride, dimethylsilanediyl-bis(methylisopropylcyclopentadienyl) hafnium dichloride, dimethylsilanediyl-bis (methylphenylindenyl) zirconium dichloride, dimethylsilanediyl-bis(methylnaphthylindenyl) zirconium dichloride and/or dimethylsilanediyl-bis(tetrahydroindenyl) zirconium dichloride.

As metalloxane compounds B of the catalyst for the inventive method of preparing blends from olefin polymers and syndiotactic vinyl polymers, especially cyclic and/or linear metalloxane are suitable, which are synthesized by the hydrolytic condensation of $C_1$–$C_4$ trialkyl compounds of boron, aluminum or gallium and/or of $C_1$–$C_4$ tetralkyl compounds of germanium, tin or lead.

As metal alkyl compounds C of the catalyst for the inventive method of preparing blends of olefin polymers and syndiotactic vinyl polymers, preferably metal alkyl compounds, such as tributyl boron, triethyl aluminum, triethyl boron, trihexyl aluminum, triisobutyl aluminum, triisopropyl aluminum and/or trimethyl aluminum are suitable.

The transition metal compounds D of the catalyst for the inventive method of preparing blends of olefin polymers and syndiotactic vinyl polymers are halides, alkoxides, alkoxy halides, acetyl acetonates, cyclopentadienyl compounds, indenyl compounds and/or additional N-, P- or B-containing organometallic compounds of transition metals of the IV A and V A groups of the periodic system as well as of mixtures of these transition metal compounds.

Preferably suitable halides of transition metals of groups IV A and V A of the periodic system for use as transition metal compounds D of the complex coordinative catalyst for the inventive method of preparing blends of olefin polymers and syndiotactic vinyl polymers are $TiCl_4$, $TiCl_3$, $TiCl_2$, $TiBr_4$, $TiCH_3Cl$, $MeTiCl_6$, $CrCl_3$, $VCl_4$, $VOCl_3$, $VCl_3$, $NbCl_5$, $ZrCl_4$ and/or $Zr(CH_2C_6H_5)_2Cl_2$.

Preferably suitable alkoxides of transition metals of groups IV A and V A for use as transition metal compounds D of the complex coordinative catalyst for the inventive method of preparing blends of olefin polymers and syndiotactic vinyl polymers are $Ti(OCH_3)_4$, $Ti(OC_2H_5)_4$, $Ti(OC_3H_7)_4$, $Ti(OC_4H_9)_4$, $Ti(OC_{18}H_{37})_4$, $Ti(OCH_2CH(CH_2CH_3)CH_2)_3CH_3)_4$, $Zr(OC_3H_7)_4$ and/or $VO(OC_4H_9)_4$.

Preferred alkoxy halides of transition metals of groups IV A and V A for use as transition metal compounds D of the complex coordinative catalyst for the inventive method of preparing blends of olefin polymers and syndiotactic vinyl polymers are $Ti(OC_2H_5)Cl_3$, $Ti(OC_3H_7)Cl_3$, $Ti(OC_3H_7)_2Cl_2$, $Ti(OC_3H_7)_3Cl$, $Ti(OC(C(CH_3)_3)_3)_2Cl_2$ and/or $Zr(OC_3H_7)_3Cl$.

Examples of suitable acetyl acetonates of transition metals of groups IV A and V A for use as transition metal compounds D of the complex coordinative catalyst for the inventive method of preparing blends of olefin polymers and syndiotactic vinyl polymers are, in particular, $Ti(CH_3COCHCOCH_3)_2Cl_2$, $Ti(CH_3COCHCO-CH_3)_2(OC_4H_9)_2$, $Ti(CH_3COCHCOCH_3)_3$, $Zr(CH_3COCHCOCH_3)_4$ and/or $VO(CH_3COCHCOCH_3)_2$.

Preferred cyclopentadienylalkyl compounds of transition metals of groups IV A and V A for use as transition metal compounds D of the complex coordinative catalyst for the inventive method of preparing blends of olefin polymers and syndiotactic vinyl polymers are $(C_5H_5)Ti(CH_3)_3$, $(C_5H_5)Ti(C_2H_5)_3$, $(C_5H_5)Ti(C_4H_9)_3$, $(C_5H_5)Ti(CH_2C_6H_5)$, and/or $(CH_2)(C_5H_5)_2Ti-(CH(C_6H_5)(CH_2CH_2)$.

As cyclopentadienyl halides of transition metals of groups IV A and V A for use as transition metal compounds D of the complex coordinative catalyst for the inventive method of preparing blends of olefin polymers and syndiotactic vinyl polymers are, in particular, $(C_5H_5)TiCl_3$, $(C_5H_5)_2TiCl_2$, $(C_5H_5)Ti(OC_4H_9)_2Cl_2$, $(C_5H_5)Ti(OCH_3)_2Cl_2$, $(C_5H_5)Ti(OC_6H_5)Cl_2$, $(CH_2)(C_5H_5)_2TiCl_2$, $(CH_2CH_2)((C_5H_5(CH_3)_4)_2TiCl_2$, $(C_5H_5)ZrCl_3$, $(C_5H_5)NbCl_2$ and/or $(C_5H_5)ZrCl_2$.

Examples of suitable cyclopentadienylalkoxy compounds of transition metals of groups IV A and V A for use as transition metal compounds D of the complex coordinative catalyst for the inventive method of preparing blends of olefin polymers and syndiotactic vinyl polymers are $(C_5H_5)Ti(OCH_3)_3$, $(C_5H_5)Ti(OC_2H_5)_3$, $(C_5H_5)Ti(OC_6H_5)_3$, $(C_5H_5)Ti(OCH_3)_3$ and/or $(C_5H_5)Zr(OC_6H_5)_3$.

Preferred pentamethylcyclopentadienyl compounds of transition metals of groups IV A and V A for use as transition metal compounds D of the complex coordinative catalyst for the inventive method of preparing blends of olefin polymers and syndiotactic vinyl polymers are $(C_{10}H_{15})Ti(OCH_3)_3$, $(C_{10}H_{15})Ti(OC_2H_5)_3$, $(C_{10}H_{15})Ti(OC_6H_5)_3$, $(C_{10}H_{15})Ti(OC_4H_9)_2Cl$ and/or $(C_{10}H_{15})Ti(OCH_3)_2Cl$.

As indenyl compounds of transition metals of groups IV A and V A for use as transition metal compounds D of the complex coordinative catalyst for the inventive method of preparing blends of olefin polymers and syndiotactic vinyl polymers, $(C_9H_8)Ti(N(CH_3)_2)_3$ and/or $(C_9H_8)Ti(OCH_3)_3$, in particular, are suitable.

As additional N-, P- or B-containing organometallic compounds of transition metals of groups IV A and V A for use as transition metal compounds D of the complex coordinative catalyst for the inventive method of preparing blends of olefin polymers and syndiotactic vinyl polymers, $TiCl_3(NC_2H_5)_2)$, $(C_5H_5)Ti(N(CH_3)_2)_3$, $(((C_6H_5)_2P(O))_3CHTiCl_3$, $(((C_6H_5)_2P(O))_3CHTi(CH_3)_3$, $(H(C_3H_5N_2)_3B(C_5H_5)Ti(CH_3)_2$, $(H(C_3H_5N)_3B(C_5H_5)Ti(OCH_3)_2$ and/or $Zr(N(CH_3)_2)_4$, are suitable.

As metal alkyl compounds E of the catalyst for the inventive method of preparing blends of olefin polymers and syndiotactic vinyl polymers, preferably metal alkyl compounds, such as diethyl zinc, diethyl magnesium, dimethyl zinc, ethylbutyl magnesium or butyl lithium are suitable.

The molar ratio of Al:Ti in the catalyst systems used preferably is between 100 and 1000.

Suitable olefins, which are used for the inventive method of preparing blends of olefin polymers and syndiotactic vinyl polymers, preferably are $C_2$–$C_{20}$-α-olefins, particularly ethylene, propylene, 1-butene, 1-hexene, 1-octene, 1-decene, 1-heptene, 1-pentene and/or 1-nonene and/or $C_5$–$C_{20}$ branched olefins, particularly 4-phenyl-1-butene, 6-phenyl-1-hexene, 3-methyl-1-butene, 4-methyl-1-pentene, 3-methyl-1-pentene, 3-methyl-1-hexene, 4-methyl-1-hexene, 5-methyl-1-hexene, 3,3-dimethyl-1-pentene, methylethyl-1-pentene, ethyl-1-pentene, ethyl-1-hexene, dimethyl-1-butene, 3,4-diethyl-1-butene, ethyl-1-octene, dimethyl-1-pentene, 4,4-dimethyl-1-pentene, cyclopentene, methylcyclohexene, vinylcyclohexane, vinylcyclohexene, norbornene, 5-methylnorbornene, 5-isobutylnorbornene, 5-ethylnorbornene, 5,6-dimethylnorbornene and 1-methylnorbornene. Mixtures of these olefins can also be used advantageously.

Ethylene, propylene, 1-butene, 4-methyl-1-pentene, cyclopentene and/or norbornene or mixtures of these olefins are especially preferred.

Preferred aromatic vinyl compounds, which are used for the inventive method of preparing blends from olefin polymers and syndiotactic vinyl polymers, are α-ethylstyrene, α-methylstyrene, bromostyrene, butenyl-α-methyl styrene. butenylstyrene, chloroethylstyrene, chlorostyrene, dimethylstyrene, dimethyl-t-butylsilylstyrene, divinylbenzene, divinyltoluene, ethylbutenylstyrene, fluorostyrene, isopropenylstyrene, methylbutenylstyrene, methylfluorostyrene, methylstyrene, pentenylstyrene, propenylstyrene, styrene, t-butylstyrene, triethylsilylstyrene, trimethylsilylstyrene, triphenylsilylstyrene, vinylbiphenyl, vinylbromobiphenyl, vinylbutenylbiphenyl, vinylchlorobiphenyl, vinylfluorobiphenyl, vinylmethylbiphenyl vinylphenylanthracene, vinylphenylnaphthalene, vinylphenylphenanthrene, vinylphenylpyrene, vinylphenylterphenyl, vinylterphenyl and/or vinyltrimethylsilylbiphenyl. Mixtures of these aromatic vinyl monomers are also used advantageously.

Suitable methacrylate esters, which are used for the inventive method of preparing blends of olefin polymers and syndiotactic vinyl polymers, preferably are methyl methacrylate, t-butyl methacrylate, glycidyl methacrylate, allyl methacrylate, methallyl methacrylate, $C_2$–$C_8$ alkyl methacrylates such as ethyl methacrylate or ethylhexyl methacrylate, $C_2$–$C_8$ hydroxyalkyl methacrylates such as 2-hydroxyethyl methacrylate or hydroxyoctyl methacrylate, $C_3$–$C_8$ cycloalkyl methacrylates such as cyclohexyl methacrylate or ethylcyclohexyl methacrylate and/or $C_6$–$C_{12}$ aryl methacrylates such as benzyl methacrylate or t-butylphenyl methacrylate.

As inert diluents for the inventive method of preparing blends of olefin polymers and syndiotactic vinyl polymers, particularly aliphatic, cycloaliphatic and/or aromatic compounds are used, which do not contain any functional groups.

The inert conditions are realized by a blanket of inert gases, such as nitrogen or argon.

A preferred variation of the thermoplastic homogenization of the inventive blends of olefin polymers and syndiotactic vinyl polymers in extruders or thermoplast kneaders consist therein that the homogenization takes place above the melting temperature of the olefin polymers and below the melting temperature of the syndiotactic vinyl polymers.

The inventive blends of olefin polymers and syndiotactic vinyl polymers with a finely dispersed distribution of the components of the blend, a high dimensional stability at elevated temperatures and improved printability and paintability are suitable particularly for the production of films, sheets, fibers, panels, coatings, pipes, hollow objects, injection molded products and/or foams.

The invention is explained by means of the following examples.

EXAMPLE 1

Dry toluene (2 L) is added to a 10 L stirred autoclave and 120 mL of a methyl aluminoxane solution (10% by weight of methyl aluminoxane in toluene) are added subsequently. The solution is stirred for about 30 minutes at 50° C. in order to remove any impurities still present. The solution was discharged and the reactor dried under vacuum.

To 3 L of toluene in the 10 L stirred autoclave, 790 mL of methyl aluminoxane solution in toluene were added and stirred for 15 minutes at 50° C. Subsequently, the catalysts were added: 204 mg of EnInd$_2$HfCl$_2$ in 64 mL of a methyl aluminoxane solution in toluene and 175 mg of CpTiCl$_3$ in 32 mL of toluene. After the addition of 128 mL of styrene, the pressure was increased to 3.5 bar with propene. The polymerization was carried out while stirring for 6 hours at 50° C., the propene pressure being kept constant by further additions of propene. The reaction was terminated by adding the reaction solution to methanolic hydrochloric acid.

After a working-up procedure, 420 g of a white, powdery material were obtained. The blend of polypropylene and polystyrene was plasticized in a Haake laboratory extruder at a mass temperature of 210° C., drawn off as an extrudate and granulated.

DSC measurements of the blend revealed two separate melting temperatures of 131° C. (polypropylene) and 258° C. (polystyrene).

EXAMPLE 2

The 10 L stirred autoclave was prepared for the polymerization as in Example 1. To 3 L of toluene in the 10 L stirred autoclave, 790 mL of methyl aluminoxane solution in toluene were added and stirred for 15 minutes at 50° C. Subsequently, the catalysts were added: 64 mg of EnIndHfCl$_2$ in 10 mL of a methyl aluminoxane solution in toluene and 175 mg of CpTiCl$_3$ in 32 mL of toluene. After the addition of 128 mL of styrene, the pressure was increased this time to 4 bar with ethene. The polymerization was carried out while stirring for 3 hours at 50° C., the ethene pressure being kept constant by farther additions of ethene. After the reaction was terminated with methanolic hydrochloric acid and the product worked up, 386 g of a white, powdery material were obtained. The blend of polyethylene and polystyrene was plasticized in a Haake laboratory extruder at a mass temperature of 195° C., drawn off as an extrudate and granulated. The melting temperature of the polyethylene was 119° C.; on the other hand, only a recrystallization at 219.5° C. was found for the polystyrene.

EXAMPLE 3

The 10 L stirred autoclave was prepared for the polymerization as in Example 1. To 3.14 L of toluene in the 10 L stirred autoclave, 760 mL of methyl aluminoxane solution in toluene were added and stirred for 15 minutes at 50° C. Subsequently, the catalysts were added: 56 mg of (Me$_2$Si)Ind$_2$ZrCl$_2$ and 20 mL of a toluene solution of methyl aluminoxane, 175 mg of CpTiCl$_3$ in 32 mL of toluene and 60 mg of aluminum triisobutyl in 40 mL of toluene. After the addition of 218 g of norbornene in 44 mL of toluene and 128 mL of styrene, the pressure was increased to 3.5 bar with propene. The polymerization was carried out while stirring for 6 hours at 50° C., the propene pressure being kept constant by further additions of propene. After the reaction was terminated with methanolic hydrochloric acid and the product worked up, 50 g of a mixture of a white, powdery material and a colorless amorphous material were obtained.

The blend of propene-norbornene copolymer and polystyrene was plasticized for 15 minutes in an electrically heated 100 cc kneading chamber at a mass temperature of 230° C., discharged and ground.

EXAMPLE 4

The 10 L stirred autoclave was prepared for the polymerization as in Example 1. To 3 L of toluene in the 10 L stirred autoclave, 790 mL of methyl aluminoxane solution in toluene were added and stirred for 15 minutes at 50° C. Subsequently, the catalysts were added: 36 mg of Cp$_2$ZrCl$_2$ in 10 mL of a toluene solution of methyl aluminoxane, 202 mg of EnInd$_2$HfCl$_2$ in a toluene solution of methyl aluminoxane and 175.4 mg of CpTiCl$_3$ in 32 mL of toluene. After the addition of 128 mL of styrene, the pressure was increased to 3.5 bar with propene. The polymerization was carried out while stirring for 3 hours at 50° C., the propene pressure being kept constant by further additions of propene. After the reaction was terminated with methanolic hydrochloric acid and the product worked up, 360 g of a mixture of a white, powdery material and a colorless, amorphous material were obtained.

The blend of propylene and polystyrene was plasticized in a Haake laboratory extruder at a mass temperature of 205° C., discharged and ground.

EXAMPLE 5

The 10 L stirred autoclave was prepared for the polymerization as in Example 1. To 3 L of toluene in the 10 L stirred autoclave, 790 mL of methyl aluminoxane solution in toluene were added and stirred for 15 minutes at 50° C. Subsequently, the catalysts were added: 64 mg of $EnInd_2HfCl_2$ in 10 ML of a toluene solution of methyl aluminoxane, 175.4 mg of $(Me_5Cp)TiCl_3$ in 32 mL of toluene. After the addition of 148 mL of p-methylstyrene, the pressure was increased to 3.5 bar with propene. The polymerization was carried out while stirring for 6 hours at 50° C., the propene pressure being kept constant by further additions of propene. The reaction was terminated by adding the reaction solution to methanolic hydrochloric acid. After working up, 176 g of a mixture of a white, powdery material were obtained.

The blend of propylene and poly-p-methylstyrene was plasticized in a Haake laboratory extruder at a mass temperature of 210° C., drawn off as an extrudate and granulated.

EXAMPLE 6

A 20 L stirred reactor was prepared for the polymerization as in Example 1. To 6 L of toluene in the 20 L stirred reactor, 2.4 L of a methyl aluminoxane solution in toluene were added and stirred for 15 minutes at 50° C. After the addition of 3.0 L of 1-octene and 360 mL of styrene, stirring was continued for 15 minutes. Subsequently, the catalysts were added: 600 mg of $EnInd_2HfCl_2$ in 96 mL of a toluene solution of methyl aluminoxane and 528 mg of $CpTiCl_3$ in 96 mL of toluene. The polymerization temperature was 50° C. and the polymerization time 6 hours. A mixture (300 g) of amorphous poly(1-octene) and white, powdery polystyrene, with a melting temperature of 251° C. was obtained.

The blend of poly(1-octene) was plasticized in a Haake laboratory extruder at a mass temperature of 180° C., drawn off as an extrudate and granulated.

EXAMPLE 7

The reactor was prepared as in Example 1. To 100 mL of toluene, 5.2 mL of a methyl aluminoxane solution in toluene and 6.35 g of $EnInd_2HfCl_2$ in 1 mL of a solution of methyl aluminoxane in toluene were added. The polymerization was carried out while stirring for 1 hour at 30° C. under a propene pressure of 2 bar. After the propene pressure was relieved, 1.8 mL of methyl aluminoxane solution and 5.8 mg of $Cp_2ZrCl_2$ in 2 mL of a solution of methyl aluminoxane in toluene, as well as 8 mL of methyl methacrylate, which had been preactivated in 17.2 mL of a 1.1 M solution of $ZnEt_2$ in toluene, were added. The polymerization was terminated by adding the reaction solution to methanolic hydrochloric acid.

After working up, 8.5 g of a white powdery mixture of polypropylene and poly(methyl methacrylate) were obtained.

EXAMPLE 8

The procedure of Example 7 was followed. However, ethene was used as the olefin and the ethene pressure was kept constant at 4 bar by the addition of ethene. After the ethene pressure was relieved, the reactor was cooled to 0° C. and as in Example 7, filled with 1.8 mL of a methyl aluminoxane solution and 5.8 mg of $Cp_2ZrCl_2$ in 2 mL of a solution of methyl aluminoxane in toluene. In addition, 1.2 mL of a 0.087 M solution of 1,1-diphenyl-3-methylpentyl lithium in cyclohexane/toluene as well as 3.9 mL of a 0.24 M solution of an aromatic, substituted, ether alcoholate were added. After the addition of 2 mL of butyl methacrylate, the polymerization was carried out for 1 hour. The reaction was terminated by precipitation in methanolic hydrochloric acid.

A powdery mixture (9.4 g) of polyethylene, having a melting point of 120° C. and poly(butyl methacrylate), with a syndiotactic content of 67%, was obtained.

What is claimed is:

1. Blends of olefin polymers and syndiotactic vinyl polymers with a finely dispersed distribution of the components of the blend, a high dimensional stability at elevated temperatures and improved printability and paintability comprising, 1 to 99% by weight of $C_2$–$C_{20}$ polyolefins or $C_2$–$C_{20}$ olefin copolymers, 99% to 1% by weight of syndiotactic vinyl polymers selected from the group consisting of $C_8$–$C_{14}$ aromatic polyvinyl polymers, $C_4$–$C_{15}$ polymethacrylate esters and $C_4$–$C_{15}$ methacrylate ester copolymers, the blends being prepared by a) the catalytic polymerization of $C_2$–$C_{20}$ olefins in admixture with up to 99% by weight of $C_8$–$C_{14}$ aromatic vinyl compounds using a catalyst mixture, at –30° C. to +100° C. under inert conditions in the pressure range of 0.1 bar to 20 bar in the presence of 10 to 2,000% by weight, based on the weight of the $C_2$–$C_{20}$ olefins and $C_8$–$C_{14}$ aromatic vinyl compounds, of inert diluent and 0.1% by weight to 10% by weight, based on the weight of the $C_2$–$C_{20}$ olefins, of the catalyst mixture, the catalyst mixture being $10^{-4}\%$ by weight to $10^{-2}\%$ by weight of bridged metallocene complexes A, 0.1 to 10% by weight of metalloxane compounds B, 0.001% by weight to 1.0% by weight of metal alkyl compounds C, and up to $10^{-2}\%$ by weight of transition metal compounds D, in each case based on the weight of the $C_2$–$C_{20}$ olefins and $C_8$–$C_{14}$ aromatic vinyl compounds, bridged metallocene complexes A of the catalyst mixture being metallocene complexes having the formula

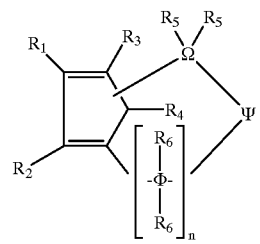

as well as mixtures of these bridged metallocene complexes, in which $R_1$, $R_2$, $R_3$, and $R_4$ are hydrogen, (Si-substituted) alkyl, or (Si-substituted) aryl, $R_5$, and $R_6$ are hydrogen, halogen, alkyl, or aryl, $\Omega$ is Ti, Zr, Hf, V, Nb, or Ta, each occurrence of $\phi$ is independently selected from the group consisting of carbon and silicon and n is a whole number from 1 to 6, or each occurrence of $\phi$ is independently selected from the group consisting of germanium and tin and n=1, $\Psi$ is oxygen, sulfur, alkyl- or aryl-substituted N, P or Si or

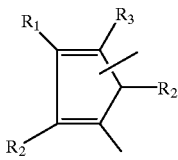

in which $R_1$, $R_2$, $R_3$ and $R_4$ have the same meanings as in complex A,
the metalloxane compounds B being oligomeric or polymeric cyclic or linear metalloxane compounds, or mixtures thereof of metals of the 3rd main group and/or the 4th main group with the general formula (1) or (2)

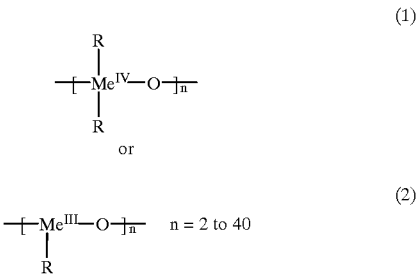

as well as monomeric or oligomeric linear metalloxane compounds of the general formula (3) or (4)

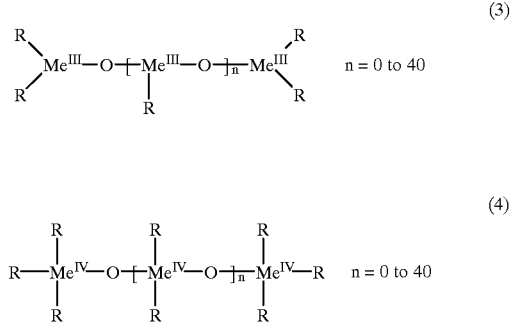

in which each occurrence of $Me^{IV}$ is independently selected from the group consisting of Ge, Sn, and Pb and each occurrence of $Me^{III}$ is independently selected from the group consisting of B, Al, Ga, and In, $R=C_1-C_{18}$ alkyl, as well as mixtures of metalloxanes selected from the group consisting of metalloxanes of the general formulas (1), (2), (3) and (4), the metal alkyl compounds C being metal alkyls of boron and/or aluminum or mixtures of these metal alkyl compounds, b) subsequently, addition of up to 900%, based on the $C_2-C_{20}$ olefins and $C_8-C_{14}$ aromatic vinyl compounds used in a), of $C_4$ to $C_{15}$ methacrylate esters, of up to 1.0% by weight, based on the weight of the $C_2-C_{20}$ olefins and $C_4-C_{15}$ methacrylate esters used, of metal alkyl compounds E and, of up to $5 \times 10^{-3}$% by weight of bridged metal complexes A, up to 6% by weight of metalloxane compounds B and up to 0.05% by weight of metal alkyl compounds C, in each case based on the weight of the $C_2-C_{20}$ olefins and $C_8-C_{14}$ aromatic vinyl compounds and $C_4-C_{15}$ methacrylate esters,
the compounds A, B and C being identical with those compounds named under a), c) subsequently the pressure being maintained in the range recited in a) or being increased up to 50 bar, d) subsequently, the $C_8-C_{14}$ aromatic vinyl compounds, $C_4-C_{15}$ methacrylate esters and unreacted $C_2-C_{20}$ olefins, contained in the reaction mixtures a) and b), being polymerized catalytically at temperatures of $-30°$ C. to $100°$ C. in the presence of the catalysts contained in the reaction mixtures a) and b), e) subsequently, the catalysts being deactivated by acids and the $C_2-C_{20}$ polyolefins or $C_2-C_{20}$ olefin copolymers and the syndiotactic vinyl polymers being isolated, f) and subsequently, the mixture of $C_2-C_{20}$ polyolefins or $C_2-C_{20}$ olefin copolymers and syndiotactic vinyl polymers being plasticized in extruders or in kneaders for thermoplastic materials at temperatures above the melting temperature of the $C_2-C_{20}$ polyolefins or $C_2-C_{20}$ olefin copolymers.

2. The blends of olefin polymers and syndiotactic vinyl polymers of claim 1, wherein the $C_2$ to $C_{20}$ polyolefins and $C_2$ to $C_{20}$ olefin copolymers are olefin polymers with a high degree of order and/or amorphous olefin polymers, which can be produced by the complex coordinative polymerization of olefins selected from the group consisting of ethylene, propylene, 1-butene, 4-methyl-1-pentene, cyclopentene and norbornene and mixtures of these olefins.

3. The blends of olefin polymers and syndiotactic vinyl polymers of claim 1 or 2, wherein the syndiotactic vinyl polymers are syndiotactic $C_8$ to $C_{14}$ aromatic vinyl compounds.

4. The blends of olefin polymers and syndiotactic vinyl polymers of claim 1 or 2, wherein the syndiotactic vinyl polymers are syndiotactic $C_4$ to $C_{15}$ polymethacrylate esters and/or syndiotactic $C_4$ to $C_{15}$ methacrylate ester copolymers.

5. The blends of olefin polymers and syndiotactic vinyl polymers of claim 1 or 2, wherein the blends contain syndiotactic vinyl polymers in the form of finely dispersed particles, which have not been melted and have an average particle diameter of 5 to 250 μm.

6. A method for the preparation of blends of olefin polymers and syndiotactic vinyl polymers with a finely dispersed distribution of the components of the blend, high dimensional stability at elevated temperatures and improved printability and paintability comprising, a) polymerizing $C_2-C_{20}$ olefins in admixture with up to 99% by weight of $C_8-C_{14}$ aromatic vinyl compounds using a catalyst mixture at $-30°$ C. to $+100°$ C. under inert conditions in the pressure range of 0.1 bar to 20 bar in the presence of 10 to 2,000% by weight, based on the weight of the $C_2-C_{20}$ olefins and $C_8-C_{14}$ aromatic vinyl compounds, of inert diluent and 0.1% by weight to 10% by weight, based on the weight of the $C_2-C_{20}$ olefins, of the catalyst mixture, the catalyst mixture being $10^{-4}$% by weight to $10^{-2}$% by weight of bridged metallocene complexes A, 0.1 to 10% by weight of metalloxane compounds B, 0.001% by weight to 1.0% by weight of metal alkyl compounds C, and up to $10^{-2}$% by weight of transition metal compounds D, in each case based on the weight of the $C_2-C_{20}$ olefins and $C_8-C_{14}$ aromatic vinyl compounds, bridged metallocene complexes A being metallocene complexes having the formula

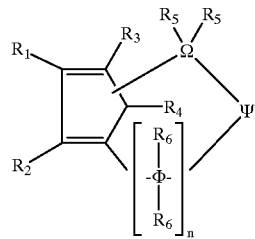

as well as mixtures of these bridged metallocene complexes, in which $R_1$, and $R_2$, $R_3$, and $R_4$ are hydrogen, (Si-substituted) alkyl, or (Si-substituted) aryl, $R_5$ and $R_6$ are hydrogen, halogen, alkyl, or aryl, $\Omega$ is Ti, Zr, Hf, V, Nb, or Ta, each occurrence of $\Phi$ is independently selected from the group consisting of carbon and silicon and n is a whole number from 1 to 6, or each occurrence of $\Phi$ is independently selected from the group consisting of germanium and tin and n=1, $\Psi$ is oxygen, sulfur, alkyl- or aryl-substituted N, P or Si or,

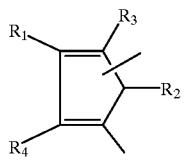

in which $R_1$, $R_2$, $R_3$ and $R_4$ have the same meanings as in complex A, the metalloxane compounds B being oligomeric or polymeric cyclic or linear metalloxane compounds, or mixtures thereof of metals of the 3rd main group and/or the 4th main group with the general formula (1) or (2)

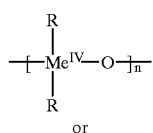

(1)

or

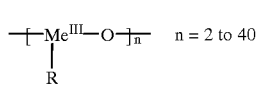

(2)

as well as monomeric or oligomeric linear metalloxane compounds of the general formula (3) or (4)

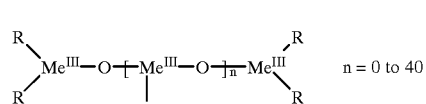

(3)

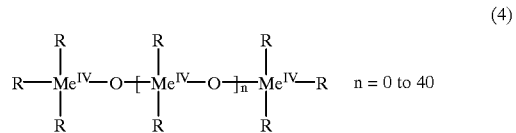

(4)

in which each occurrence of $Me^{IV}$ is independtly selected from the group consisting of Ge, Sn, and Pb and each occurrence of $Me^{III}$ is independently selected from the group consisting of B, Al, Ga and In, $R=C_1-C_{18}$ alkyl, as well as mixtures of metalloxanes selected from the group consisting of metalloxanes of the general formula (1), (2), (3) and (4), the metal alkyl compounds C being metal alkyls of boron and/or aluminum or mixtures of these metal alkyl compounds, b) subsequently, adding up to to 900%, based on the $C_2-C_{20}$ olefins and $C_8-C_{14}$ aromatic vinyl compounds used in a), of $C_4$ to $C_{15}$ methacrylate esters, of up to 1.0% by weight, based on the weight of the $C_2-C_{20}$ olefins and $C_4-C_{15}$ methacrylate esters used, of metal alkyl compounds E and of up to $5 \times 10^{-3}$% by weight of bridged metal complexes A, up to 6% by weight of metalloxane compounds B and up to 0.05% by weight of metal alkyl compounds C, in each case based on the weight of the $C_2-C_{20}$ olefins and $C_8-C_{14}$ aromatic vinyl compounds and $C_4-C_{15}$ methacrylate esters used, the compounds A, B and C being identical with those compounds named under a), c) subsequently the pressure being maintained in the range recited in a) or being increased up to 50 bar, d) subsequently, polymerizing the $C_8-C_{14}$ aromatic vinyl compounds, $C_4-C_{15}$ methacrylate esters and unreacted $C_2-C_{20}$ olefins, contained in the reaction mixtures a) and b), at temperatures of –30° C. to 100° C. in the presence of the catalysts contained in the reaction mixtures a) and b), e) subsequently, deactivating the catalysts by acids and isolating the $C_2-C_{20}$ polyolefins or $C_2-C_{20}$ olefin copolymers and the syndiotactic vinyl polymers, f) and subsequently, plasticizing the mixture of $C_2-C_{20}$ polyolefins or $C_2-C_{20}$ olefin copolymers and syndiotactic vinyl polymers.

7. The method for preparing blends of polyolefin polymers and syndiotactic vinyl polymers of claim 6, wherein the olefins, α-olefins and/or cyclic olefins are at least one olefin selected from the group consisting of ethylene, propylene, 1-butene, 4-methyl-1-pentene, cyclopentene, norbornene and mixtures of these olefins.

8. The method for preparing blends of polyolefin polymers and syndiotactic vinyl polymers of claim 6 or 7, wherein the syndiotactic vinyl polymers are $C_8$ to $C_{14}$ aromatic vinyl compounds.

9. The method for preparing blends of polyolefin polymers and syndiotactic vinyl polymers of claim 6 or 7, wherein the $C_4$ to $C_{15}$ methacrylate esters are at least one $C_4$ to $C_{15}$ methacrylate ester selected from the group consisting of methyl methacrylate, $C_2$ to $C_8$ alkyl methacrylates, t-butyl methacrylate, $C_2$ to $C_8$ hydroxyalkyl methacrylate, $C_3$ to $C_8$ cycloalkyl methacrylate, glycidyl methacrylate, allyl methacrylate, methallyl methacrylate, $C_6$ to $C_{12}$ allyl methacrylates and mixtures of these $C_4$ to $C_{15}$ methacrylate esters.

10. Films, sheets, fibers, panels, coatings, pipes, hollow objects, injection molded products and foams, comprising blends of olefin polymers and syndiotactic vinyl polymers of claim 1 or 2.

11. The blends of olefin polymers and syndiotactic vinyl polymers of claim 1, further comprising adding additives before and/or during step f), the additives being 0.01 to 2.5% by weight of stabilizers, 0.1 to 1% by weight of antistatic agents, 0.2 to 3% by weight of pigments, 0.05 to 1% by weight of nucleating agents, 5 to 40% by weight of fillers and reinforcing agents, 2 to 20% by weight of flame retardants, 1 to 30% by weight of elastomers as impact strength modifiers and/or 0.01 to 1% by weight of processing aids, in each case based on the weight of the $C_2$–$C_{20}$ polyolefins or $C_2$–$C_{20}$ olefin copolymers and of the syndiotactic vinyl polymers.

12. The blends of olefin polymers and syndiotactic vinyl polymers of claim 1, wherein the metal alkyl compounds E are metal alkyls of magnesium, zinc or lithium or mixtures of these metal alkyls, which are used with ether alcoholates.

13. The blends of olefin polymers and syndiotactic vinyl polymers of claim 3, wherein the $C_8$–$C_{14}$ aromatic vinyl compounds are produced by polymerization of $C_8$–$C_{14}$ aromatic vinyl compounds or mixtures of $C_8$–$C_{14}$ aromatic vinyl compounds selected from the group consisting of α-ethylstyrene, α-methylstyrene, bromostyrene, butenyl-α-methylstyrene, butenyl-styrene, chloroethylstyrene, chlorostyrene, dimethylstyrene, dimethyl-t-butylsilylstyrene, divinylbenzene, divinyltoluene, ethylbutenylstyrene, fluorostyrene, isopropenylstyrene, methylbutenylstyrene, methylfluorostyrene, methylstyrene, pentenylstyrene, propenylstyrene, styrene, t-butylstyrene, t-ethylsilylstyrene, trimethylsilylstyrene, triphenylsilylstyrene, vinylbiphenyl, vinylbromobiphenyl, vinylbutenylbiphenyl, vinylchlorobiphenyl, vinylfluorobiphenyl, vinylmethyl-biphenyl, vinylphenylanthracene, vinylphenylnaphthalene, vinylphenylphenanthrene, vinylphenylpyrene, vinylphenylterphenyl, vinylterphenyl, vinyltrimethylsilylbiphenyl and mixtures of these aromatic vinyl monomers.

14. The blends of olefin polymers and syndiotactic vinyl polymers of claim 4, wherein the syndiotactic $C_4$ to $C_{15}$ polymethacrylate esters and/or syndiotactic $C_4$ to $C_{15}$ methacrylate ester copolymers are produced by the catalytic polymerization of $C_4$ to $C_{15}$ methacrylate esters or mixtures of $C_4$ to $C_{15}$ methacrylate esters selected from the group consisting of methyl methacrylate, $C_2$ to $C_8$ alkyl methacrylates, t-butyl methacrylate, $C_2$ to $C_8$ hydroxyalkyl methacrylates, $C_3$ to $C_8$ cycloalkyl methacrylates, glycidyl methacrylate, allyl methacrylate, methallyl methacrylate, $C_6$ to $C_{12}$ allyl methacrylates and mixtures of them.

15. The method for preparing blends of polyolefin polymers and syndiotactic vinyl polymers of claim 6, further comprising adding additives before and/or during step f), the additives being 0.01 to 2.5% by weight of stabilizers, 0.1 to 1% by weight of antistatic agents, 0.2 to 3% by weight of pigments, 0.05 to 1% by weight of nucleating agents, 5 to 40% by weight of fillers and reinforcing agents, 2 to 20% by weight of flame retardants, 1 to 30% by weight of elastomers as impact strength modifiers and/or 0.01 to 1% by weight of processing aids, in each case based on the weight of the $C_2$–$C_{20}$ polyolefins or $C_2$–$C_{20}$ olefin copolymers and of the syndiotactic vinyl polymers.

16. The blends of olefin polymers and syndiotactic vinyl polymers of claim 6, wherein the metal alkyl compounds E are metal alkyls of magnesium, zinc or lithium or mixtures of these metal alkyls, which are used with ether alcoholates.

17. The method for preparing blends of polyolefin polymers and syndiotactic vinyl polymers of claim 8, wherein the $C_8$–$C_{14}$ aromatic vinyl compounds are produced by polymerization of $C_8$–$C_{14}$ aromatic vinyl compounds or mixtures of $C_8$–$C_{14}$ aromatic vinyl compounds selected from the group consisting of α-ethylstyrene, α-methylstyrene, bromostyrene, butenyl-α-methyl styrene, butenylstyrene, chloroethylstyrene, chlorostyrene, dimethylstyrene, dimethyl-t-butylsilylstyrene, divinylbenzene, divinyltoluene, ethylbutenylstyrene, fluorostyrene, isopropenylstyrene, methylbutenylstyrene, methylfluorostyrene, methylstyrene, pentenylstyrene, propenylstyrene, styrene, t-butylstyrene, triethylsilylstyrene, trimethylsilylstyrene, triphenylsilystyrene, vinylbiphenyl, vinylbromobiphenyl, vinylbutenylbiphenyl, vinylchlorobiphenyl, vinylfluorobiphenyl, vinylmethyl-biphenyl, vinylphenylanthracene, vinylphenylnaphthalene, vinylphenylphenanthrene, vinylphenylpyrene, vinylphenylterphenyl, vinylterphenyl, vinyltrimethylsilylbiphenyl and mixtures of these aromatic vinyl monomers.

18. The method for preparing blends of polyolefin polymers and syndiotactic vinyl polymers of claim 6, wherein the transition metal compounds D are selected from the group consisting of halides, alkoxides, alkoxyhalides, acetyl acetonates, cyclopentadienyl compounds, indenyl compounds and N-, P- and B-containing organometallic compounds of transition metals of the IV A and V A groups of the periodic system, and mixtures thereof.

* * * * *